US011273841B2

(12) United States Patent
Goldman

(10) Patent No.: US 11,273,841 B2
(45) Date of Patent: Mar. 15, 2022

(54) METHOD AND APPARATUS FOR SPOOFING PREVENTION

(71) Applicant: TOYOTA RESEARCH INSTITUTE, INC., Los Altos, CA (US)

(72) Inventor: Ron Goldman, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 81 days.

(21) Appl. No.: 16/137,067

(22) Filed: Sep. 20, 2018

(65) Prior Publication Data
US 2020/0094847 A1   Mar. 26, 2020

(51) Int. Cl.
*B60W 50/02* (2012.01)
*G05D 1/00* (2006.01)
*B60W 50/14* (2020.01)

(52) U.S. Cl.
CPC ........ *B60W 50/0205* (2013.01); *B60W 50/14* (2013.01); *G05D 1/0077* (2013.01); *G05D 1/0088* (2013.01); *B60W 2050/0215* (2013.01); *G05D 2201/0213* (2013.01)

(58) Field of Classification Search
CPC ................................ B60W 50/0205
USPC ...................................... 701/30.6
See application file for complete search history.

(56) References Cited

U.S. PATENT DOCUMENTS

| 6,269,246 B1 * | 7/2001 | Rao ...................... G01S 5/0252 455/186.1 |
| 9,069,059 B2 | 6/2015 | Vogt et al. |
| 9,081,385 B1 | 7/2015 | Ferguson et al. |
| 9,560,060 B2 | 1/2017 | Baxley et al. |
| 9,575,160 B1 | 2/2017 | Davis et al. |
| 10,166,994 B1 * | 1/2019 | Fields ................. G01C 21/3407 |
| 2014/0089243 A1 * | 3/2014 | Oppenheimer ......... G06F 21/88 706/46 |
| 2016/0226892 A1 * | 8/2016 | Sen ...................... H04L 63/1433 |
| 2017/0094527 A1 * | 3/2017 | Shattil ...................... H04K 3/44 |

(Continued)

OTHER PUBLICATIONS

Google Patents Machine Translation of CN1870025A (Downloaded Feb. 7, 2020) (https://patents.google.com/patent/CN1870025A/en?q=traffic-fingerprint+compare-period&oq=traffic-fingerprint+compare-period).*

(Continued)

*Primary Examiner* — Jean Paul Cass
(74) *Attorney, Agent, or Firm* — Oblon, McClelland, Maier & Neustadt, L.L.P.

(57) ABSTRACT

A method and an apparatus for detecting a spoofing attempt associated with an autonomous vehicle are provided. The method includes acquiring, via interface circuitry of the apparatus for spoofing prevention, one or more sensor data from one or more sensors. The one or more sensor data is annotated to obtain sensor information. The sensor information extracts traffic information that the one or more sensor data carries. Abnormal sensor data that fails to capture surrounding traffic information is discarded. Furthermore, a spoofing attempt is determined based on a determination that at least one inconsistent sensor data is identified. The at least one inconsistent sensor data provides different traffic information compared to other sensor data of the one or more sensor data generated by the one or more sensors. The vehicle is therefore informed to ignore a portion of the sensor information associated with the spoofing attempt when the spoofing attempt is identified.

18 Claims, 9 Drawing Sheets

(56) References Cited

U.S. PATENT DOCUMENTS

| | | | |
|---|---|---|---|
| 2017/0169208 A1* | 6/2017 | Jantz | H04L 9/0861 |
| 2017/0278323 A1 | 9/2017 | Gupta et al. | |
| 2017/0286675 A1* | 10/2017 | Shin | H04L 63/1416 |
| 2017/0307736 A1 | 10/2017 | Donovan | |
| 2018/0165508 A1* | 6/2018 | Othman | G06K 9/42 |
| 2018/0322711 A1* | 11/2018 | Weimerskirch | G07C 5/0808 |
| 2018/0352376 A1* | 12/2018 | Shuman | H04W 4/40 |
| 2019/0243002 A1* | 8/2019 | Song | G01S 19/20 |
| 2019/0342329 A1* | 11/2019 | Turgeman | G06F 3/0488 |
| 2019/0347390 A1* | 11/2019 | Kim | G06F 21/32 |
| 2019/0354660 A1* | 11/2019 | Fong | G06F 21/32 |
| 2020/0216080 A1* | 7/2020 | Soltanian | G08B 21/06 |

OTHER PUBLICATIONS

English machine translation of Japanese Patent Application Pub. No. JP 67-03613B2 to Matselyukh that was filed in 2015.*

* cited by examiner

METHOD AND APPARATUS FOR SPOOFING PREVENTION

BACKGROUND

An intentional spoofing attempt can be a significant concern when deploying self-driving technology. A system and method have been studied to detect and prevent such an attempt. U.S. Pat. No. 20170032671 A1 entitled "System and Method for Detecting Attack" detects an attack based on information transmitted from other vehicles and roadside machines.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a method, apparatus, and a computer-readable medium configured to detect a spoofing attempt targeting an autonomous vehicle. For purposes of this disclosure, an autonomous vehicle is generally referred to as "vehicle". According to an embodiment of the present disclosure, a method and an apparatus for detecting a spoofing attempt associated with an autonomous vehicle are provided. The method includes acquiring, via interface circuitry of the apparatus for spoofing prevention, one or more sensor data from one or more sensors. The one or more sensor data is annotated to obtain sensor information. The sensor information extracts traffic information that the one or more sensor data carries. Abnormal sensor data that fails to capture surrounding traffic information is discarded. Furthermore, a spoofing attempt is determined based on a determination that at least one inconsistent sensor data is identified. The at least one inconsistent sensor data provides different traffic information compared to other sensor data of the one or more sensor data generated by the one or more sensors. The vehicle is therefore informed to ignore a portion of the sensor information associated with the spoofing attempt when the spoofing attempt is identified.

The sensor information can extract the traffic information that the sensor data carries. The traffic information includes at least one of a position of the vehicle, a movement speed of the vehicle, a movement direction of the vehicle, positions of adjacent objects, movement speeds of adjacent objects, movement directions of adjacent objects, a road condition, a traffic signal, and a road obstacle.

The one or more sensors are either primary sensors installed originally for autonomous driving or redundant sensors spaced a distance apart from the primary sensors.

According to another embodiment of the present disclosure, a method for spoofing prevention is provided. In the disclosed method, one or more sensor data is acquired from one or more sensors installed in the autonomous vehicle via interface circuitry of an apparatus programmed for spoofing prevention. The one or more sensor data is annotated to obtain sensor information to portray traffic condition. The one or more sensor data annotation is implemented by at least one of a signal processing, an image processing, and a video processing. Abnormal sensor data is discarded that fails to capture surrounding traffic information. In addition, traffic reference information is acquired from a database via the interface circuitry of the apparatus. Both the sensor information and the traffic reference information are sent to the apparatus, and processing circuitry of the apparatus compares both the sensor information and the traffic reference information. A spoofing attempt is identified based on the comparison between the sensor information and the traffic reference information, and the vehicle is informed to ignore a portion of sensor information that is associated with the spoofing attempt.

In one example, the comparison between the sensor information and the traffic reference information includes comparing signal parameters. The signal parameters include signal intensity, signal frequency, signal period, signal amplitude, signal rising and fall times, maximum and minimum values, and signal source location of the sensor information and of the traffic reference information. The comparison between the sensor information and the traffic reference information also includes image recognition, pattern recognition, feature recognition, and signal recognition.

The method can further include performing machine learning on the sensor information and updating the portion of the sensor information that is associated with the spoofing attempt into the traffic reference information.

In one example, the traffic reference information is either pre-stored in the vehicle or updated by a third party server remotely and periodically, or updated by a machine learning algorithm with experience and learning in real-time. When the traffic reference information is updated by the third party server, the update is processed with an encryption method to prevent spoofing. The traffic reference information includes all kinds of sensor data for portraying the traffic information mentioned above. For example, the traffic reference information includes a camera data of a pothole, a Light Detection and Ranging (LIDAR) sensor data of a walking pedestrian or a falling object (e.g., a barrel) from circumjacent location when the vehicle drives, or an Inertial Measurement Unit (IMU) sensor data to catch traffic accident through a deceleration or an acceleration profile.

An apparatus for spoofing prevention is also disclosed. The apparatus includes the one or more sensors. The one or more sensors are installed in the vehicle and configured to detect the traffic information that the vehicle encounters during driving. The apparatus also includes processing circuitry that is configured to acquire the one or more sensor data from the one or more sensors and annotates the one or more sensor data to obtain sensor information. The one or more sensor data annotation can be implemented by at least one of a signal processing, an image processing, and a video processing. The sensor information extracts the traffic information that the sensor data carries. Abnormal sensor data that fails to capture surrounding traffic information is discarded. A spoofing attempt is determined based on a determination that at least one inconsistent sensor data is identified. The inconsistent sensor data provides different traffic information compared to other sensor data of the one or more sensor data generated by the one or more sensors. Via the interface circuitry, the vehicle is informed to ignore a portion of the sensor information that is associated with the spoofing attempt when the spoofing attempt is identified.

In the present disclosure, the one or more sensors are installed in the autonomous vehicle to detect the spoofing attempt. The one or more sensors are either primary sensors installed originally for autonomous driving or redundant sensors spaced a distance apart from the primary sensors. The one or more sensors capture incoming signal and generate the one or more sensor data. The one or more sensor data is annotated to obtain the sensor information. The sensor information extracts traffic information that the autonomous vehicle encounters during driving. A spoofing attempt is identified when at least one inconsistent sensor data is identified, and the at least one inconsistent sensor data provides different traffic information compared to other sensor data of the one or more sensor data generated by the one or more sensors. The spoofing attempt is also identified by verifying the consistency between the sensor information that is annotated based on the one or more sensor data and the traffic reference information that is originally stored. When the spoofing attempt is identified, the vehicle ignores the spoofing attempt and the sensor information is further output to the traffic reference information for information update.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
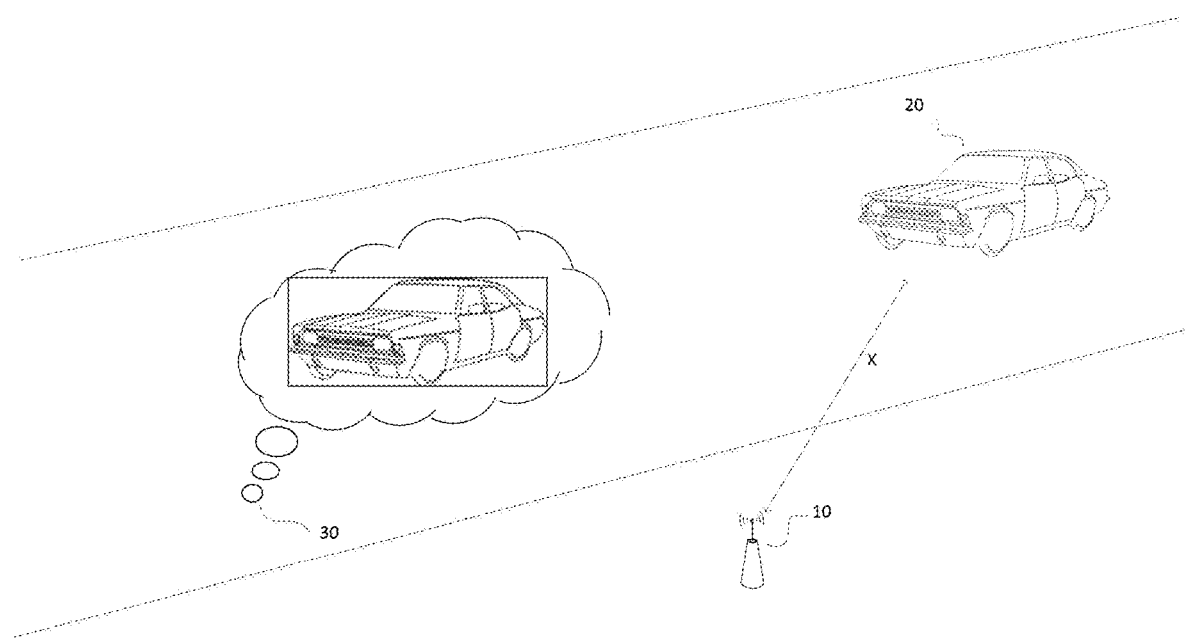
FIG. 1 is a schematic diagram illustrating an exemplary spoofing attempt.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation" "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

An autonomous vehicle can be configured to drive autonomously or automatically, that is, can take full control of driving the vehicle, such as acceleration, braking, steering, and the like. The autonomous vehicle is referred to as the vehicle in the current disclosure. The autonomous vehicle can have one or more sensors installed, such as a camera, a radar, a sonar, a LIDAR sensor, and an IMU sensor. The one or more sensors can be configured to capture surrounding traffic information of the vehicle during driving and generate one or more sensor data. The one or more sensor data can be sent to calculation unit of the vehicle. The calculation unit annotates the one or more sensor data and makes driving operations based on the annotated one or more sensor data. The sensors may be spoofed into providing inaccurate information and/or inaccurate sensed conditions (e.g., sensing that an object is present when there is no object or failing to sense an object that should be sensed). Such spoofed sensors may cause autonomous vehicles to operate undesirably. For example, as shown in FIG. 1, a spoofing source, such as a laser generation station 10, may shine a modulated laser signal X at a LIDAR sensor (not shown) mounted in vehicle 20. The projected laser signal X interferes with the LIDAR sensor's ability to detect accurate information. In an example illustrated in FIG. 1, a non-existing vehicle 30 is identified by the LIDAR sensor due to the spoofing attempt. The present disclosure is provided to detect, prevent, and/or compensate for such attempts to spoof LIDAR sensors and/or other sensors of autonomous vehicles.

Figure 2:
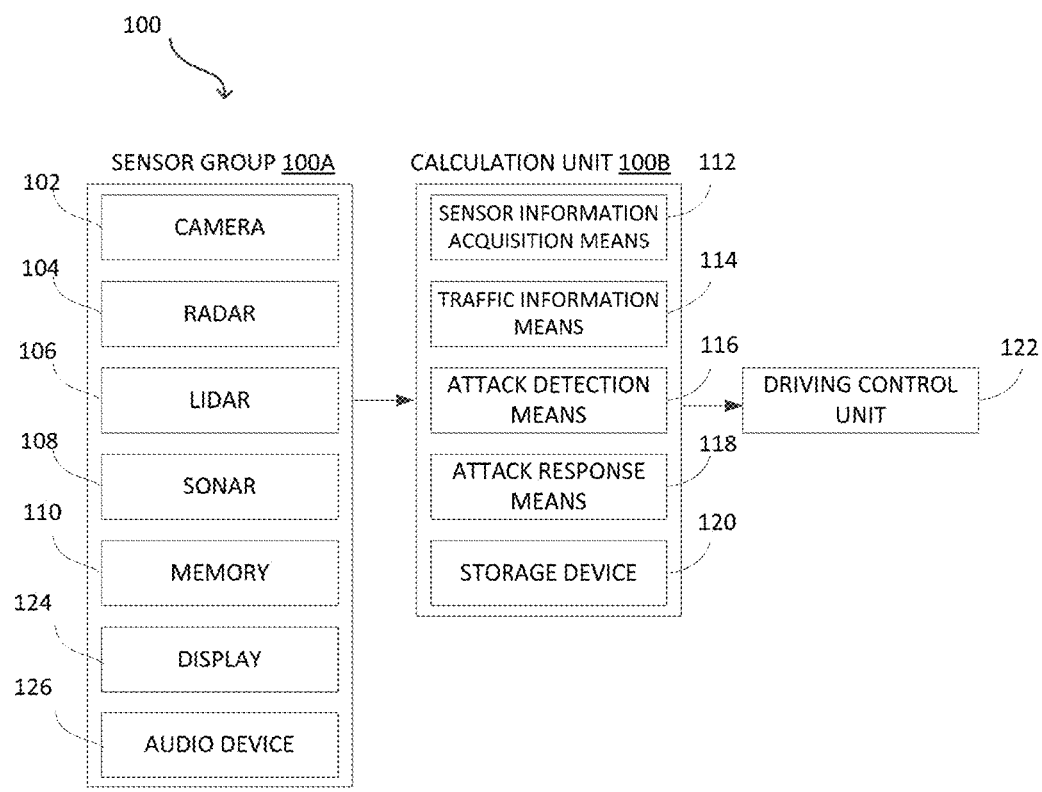
FIG. 2 is an illustration of an exemplary apparatus for spoofing prevention, in accordance with some embodiments.

FIG. 2 is an illustration of an exemplary apparatus 100 for spoofing prevention. The apparatus 100 can include a sensor group 100A, a calculation unit 100B and a driving control unit 122. The sensor group 100A can include a camera 102, a radar 104, a LIDAR 106, a sonar 108, a memory 110, a display 124, an audio device 126, or the like. The camera 102 can be a visible light camera or an infrared camera. The camera 102 can be configured to acquire at least an image of surrounding traffic conditions when the vehicle drives. The surrounding traffic conditions can include a traffic signal, a traffic sign, a position of a surrounding vehicle, a position of a surrounding pedestrian, a road condition, or the like. The image acquired by the camera 102 can be sent to the calculation unit 100B for data annotation. The data annotation can be implemented by a signal processing, an imaging processing, and a video processing through a processing circuitry of the apparatus 100. In one example, the autonomous vehicle can control itself by using the image acquired by the camera 102 and other sensor data acquired from other sensors. In another example, the acquired image can be used for spoofing detection. In an embodiment illustrated in FIG. 2, the camera 102 is a visible light camera and the image acquired by the camera 102 can be used for detecting spoofing attempt. The camera can be mounted on front, rear, top and sides of the vehicle depending on the technology requirement.

The radar 104 disclosed in FIG. 2 is configured to detect a front obstacle, a rear obstacle, or a side obstacle. The obstacle can be an adjacent vehicle, a pedestrian, or an adjacent object, or the like. The radar 104 can be a millimeter wave radar, a quasi-millimeter wave radar, or a near-infrared laser radar. The radar can be mounted on the front, rear, top and sides of the vehicle depending on the technology requirement. In an embodiment of FIG. 2, the radar 104 is a millimeter wave radar. The radar 104 mixes transmitted waves (millimeter waves) that are emitted from a transmitter and received waves reflected from the adjacent obstacle so as to extract a beat frequency in the mixed signal whereby information about a distance between the present vehicle and the adjacent obstacle is acquired, and outputs the information about the distance to the calculation unit 100B.

The LIDAR 106 illustrated in FIG. 2 can literally map surroundings at the speed of light. The LIDAR 106 can emit laser pulses, such as 100 thousands laser pulses in a second, outwards in all directions until making contact with an object. Upon contact, the laser pulses reflect back to the LIDAR sensor 106. The LIDAR 106 receives and registers the reflected pulses. The LIDAR 106 can output the sensor data to the calculation unit 100B, and the calculation unit 100B can record the reflection pulses, and calculate the distance of the object based on the laser pulse's travel time. In an example, the calculation unit 100B can identify a position, a movement speed and a movement direction of the adjacent vehicle or of the adjacent pedestrian through the LIDAR information. In another example, the calculation unit 100B can translate the information obtained from the LIDAR 106 into an animated 3D representation of LIDAR's surroundings. The LIDAR 106 can be mounted in different locations on the vehicle, such as front light, brake light, door handle, or the top.

The sonar 108 emits sound waves that travel outwards in all directions until making contact with an object, resulting in an echoing sound wave that is redirected back to the source. The distance between the sonar and the object is then calculated based on the time that the echo takes to return, in relation to the known speed of sound. Based on the echoing sound wave, a position, a movement speed, or a movement direction of the object can be calculated. In an embodiment of FIG. 2, the sonar 108 can output generated sensor data to calculation unit 100B. The calculation unit 100B can calculate a distance between a vehicle where the sonar is mounted and an adjacent vehicle, or an adjacent pedestrian through the generated sensor data. The calculation unit 100B can also identify the position, the movement speed and the movement direction of the adjacent vehicle or of the adjacent pedestrian based on the sonar information.

The memory 110 of the sensor group 100A, as shown in FIG. 2, can be an auxiliary storage device configured to store the sensor data acquired by the sensors in the sensor group 100A. The memory 110 can be a magnetic disc, a semiconductor memory, or the like.

The display 124 of the sensor group 100A is configured to display information that is sent from the calculation unit 100B. The display 124 can receive electrical signals carrying the information that is sent from the calculation unit 100B and convert the electrical signals into text messages, images, or videos. For example, the display 124 can display a text message to notify the driver of a potential spoofing attempt that the calculation unit 100B detects. The display 124 can be a cathode ray tube display (CRT), a light-emitting diode display (LED), an electroluminescent display (ELD), a liquid crystal display (LCD), an organic light-emitting diode display (OLED), or the like. In another embodiment, the display 124 can be a touchscreen that displays the information sent from the calculation unit 100B, and receives a request typed in by the user.

The audio device 126 is configured to turn an electrical signal into an audio signal. In an embodiment of FIG. 2, the audio device 126 is a speaker. Once the apparatus 100 detects a potential spoofing attempt, the apparatus 100 can output an electrical signal carrying the information of the potential spoofing attempt to the speaker 126, and the speaker 126 subsequently converts the electrical signal into an audio signal/message and provides the audio signal/message to the driver to notify the potential spoofing attempt.

The calculation unit 100B can be a well-known microcomputer or a processor having CPU (central processing unit), ROM (read only memory), RAM (random access memory) and I/O (input and output) interface. The calculation unit 100B can realize various functions by reading a program stored in storage device 120 of the calculation unit 100B. As shown in FIG. 2, the calculation unit 100B can realize a sensor information acquisition means 112, a traffic information means 114, an attack detection means 116 and an attack response means 118. However, some or all of these functions may be realized by an application specific integrated circuit (ASIC), a field programmable gate array (FPGA), a digital signal processor (DSP), or the like. In addition, the calculation unit 100B is not necessarily constituted by a single processor but may be constituted by a plurality of processors. For example, each function/means mentioned above can be associated with a dedicated chip.

The sensor information acquisition means 112 is configured to continuously, or periodically, or as occasion demands acquire one or more sensor data from the one or more sensors in sensor group 100A. The sensor information acquisition means 112 can further annotate the one or more sensor data to obtain sensor information. The sensor data annotation can be implemented by a signal processing, an image processing, a video processing, or the like. Upon the completion of the sensor data annotation, the traffic information that the one or more sensor data carries can be identified and extracted. The sensor information can extract the traffic information that the vehicle encounters during driving. The traffic information can include a position of the vehicle, a movement speed of the vehicle, a movement direction of the vehicle, positions of adjacent objects, movement speeds of adjacent objects, movement directions of adjacent objects, a road condition, a traffic signal, a road obstacle, or the like. The sensor information can be sent to attack detection means 116 by the sensor information acquisition means 112.

Figure 8:
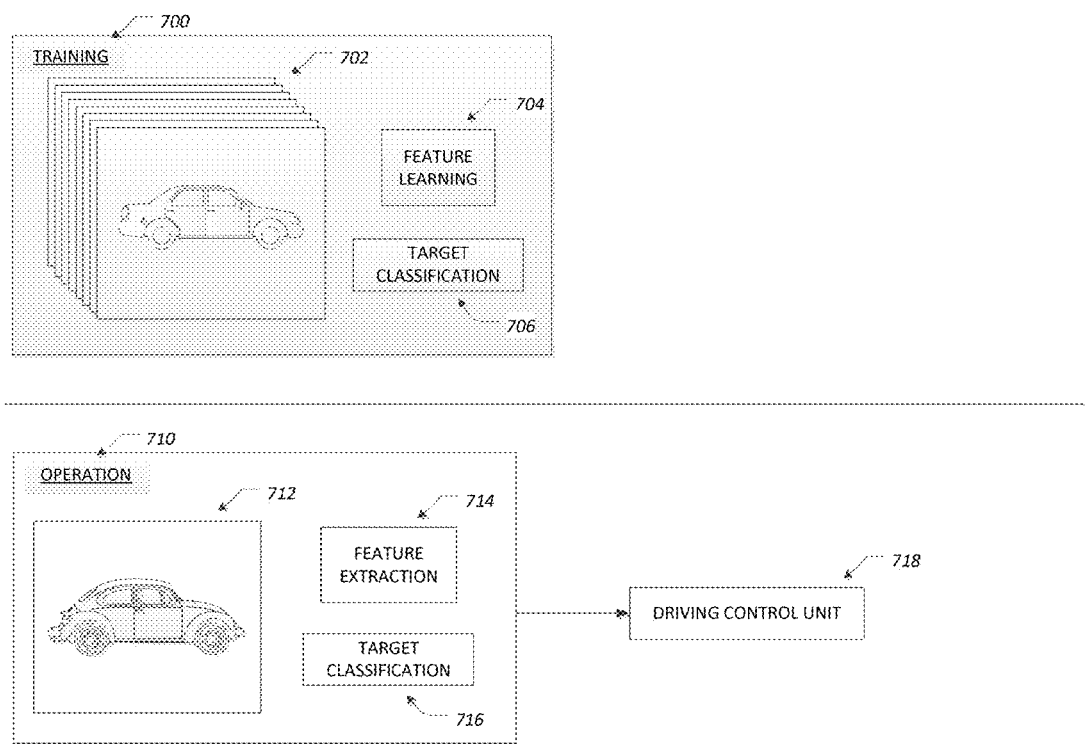
FIG. 8 is a schematic diagram illustrating an exemplary machine learning process, in accordance with some embodiments.

The traffic information means 114 can include a database to store traffic reference information and send traffic reference information to attack detection means 116 continuously, or periodically, or as occasion demands. The traffic reference information is either stored in the traffic information means 114 previously or updated by a third party server remotely and periodically. The traffic reference information can also be updated with the in-situ traffic conditions related to the spoofing attempt or a potential road hazard that is detected by the apparatus 100, or updated by a machine learning algorithm as shown in FIG. 8. When the traffic information means 114 is updated by the third party server, the update is processed with an encryption method to prevent spoofing. The traffic reference information stored in the traffic information means 114 includes all kinds of sensor data for portraying the traffic information, such as a camera data of a pothole, a LIDAR data of a walking pedestrian or a falling object (e.g., a barrel) from circumjacent location when the vehicle drives. The traffic reference information also can include traffic information, such as a position of the vehicle, a movement speed of the vehicle, a movement direction of the vehicle, positions of adjacent objects, movement speeds of adjacent objects, movement directions of adjacent objects, a road condition, a traffic signal, a road obstacle, or the like. The traffic reference information can be used to compare with the sensor information acquired from sensor group 100A to detect a spoofing attempt.

The attack detection means 116 can send a request to the sensor information acquisition means 112 to acquire the sensor information. The sensor information includes the traffic information that is sensed by the sensors in sensor group 100A. Based on the sensor information, the attack detection means 116 can categorize the one or more sensor data into 3 groups: abnormal, normal, and inconsistent. An abnormal sensor data is a sensor data that fails to capture the surrounding traffic information. For example, a camera returns all black pixels (or just noise). A normal sensor data is a sensor data that provides a valid data that may show an empty road or objects. An inconsistent sensor data is a sensor data that provides different traffic information compared to other sensor data.

The attack detection means 116 can also send a request to the traffic information means 114 to obtain the traffic reference information. The attack detection means 116 can determine whether the acquired sensor information is associated with a spoofing attempt through verifying the consistency of the sensor data generated by the sensors in sensor group 100A or based on comparison result between the sensor information and the traffic reference information. In an example, the attack detection means 116 can compare values between the sensor information and the traffic reference information. The values can include signal intensity, signal frequency, signal period, signal amplitude, signal rising and fall times, source location, maximum and minimum values, or the like. In another example, the comparison between the sensor information and the traffic reference information includes image recognition, pattern recognition, feature recognition, and signal recognition.

The attack response means 118 is configured to receive determination from the attack detection means 116, and respond to the determination. In one embodiment, when the attack detection means 116 determines that no spoofing attempt is identified, the attack detection means 116 sends the determination to the attack response means 118. The attack response means 118 accordingly acquires the sensor information from the attack detection means 116 and sends the sensor information to driving control unit 122 of the vehicle. The driving control unit 122 can control the vehicle based on the received sensor information from the attack response means 118. In one embodiment, when the attack detection means 116 determines that the sensor information is associated with a spoofing attempt, the attack detection means 116 sends the determination to the attack response means 118. The attack response means 118 accordingly ignores a portion of the sensor information that is associated with the spoofing attempt and acquires another portion of the sensor information that is not associated with the spoofing attempt. The attack response means 118 sends the other portion of the sensor information that is not associated with the spoofing attempt to the driving control unit 122 for driving control. The driving control unit 122 can guild the vehicle to take a detour route, stop at a safe place, or change a traffic lane. The attack response means 118 can further send the in-situ traffic conditions related to the spoofing attempt that is detected by the attack detection means 116 to the traffic information means 114 for traffic information update.

The driving control unit 122 can be electro-mechanical equipment. The driving control unit 122 can receive the instruction from the attack response means 118 and control the autonomous vehicle accordingly. For example, when a potential hazard is identified, the attack response means 118 sends the sensor information and instruction to the driving control unit 122, and the driving control unit 122 can control the vehicle to avoid the potential hazard by taking a detour route, stopping at a safe place, or taking a different traffic lane.

The storage device 120 disclosed in FIG. 2 can be an auxiliary storage device configured to store the sensor information acquired from sensors in the sensor group 100A or the traffic reference information. The storage device 120 can be a magnetic disc, a semiconductor memory, or the like.

Figure 3:
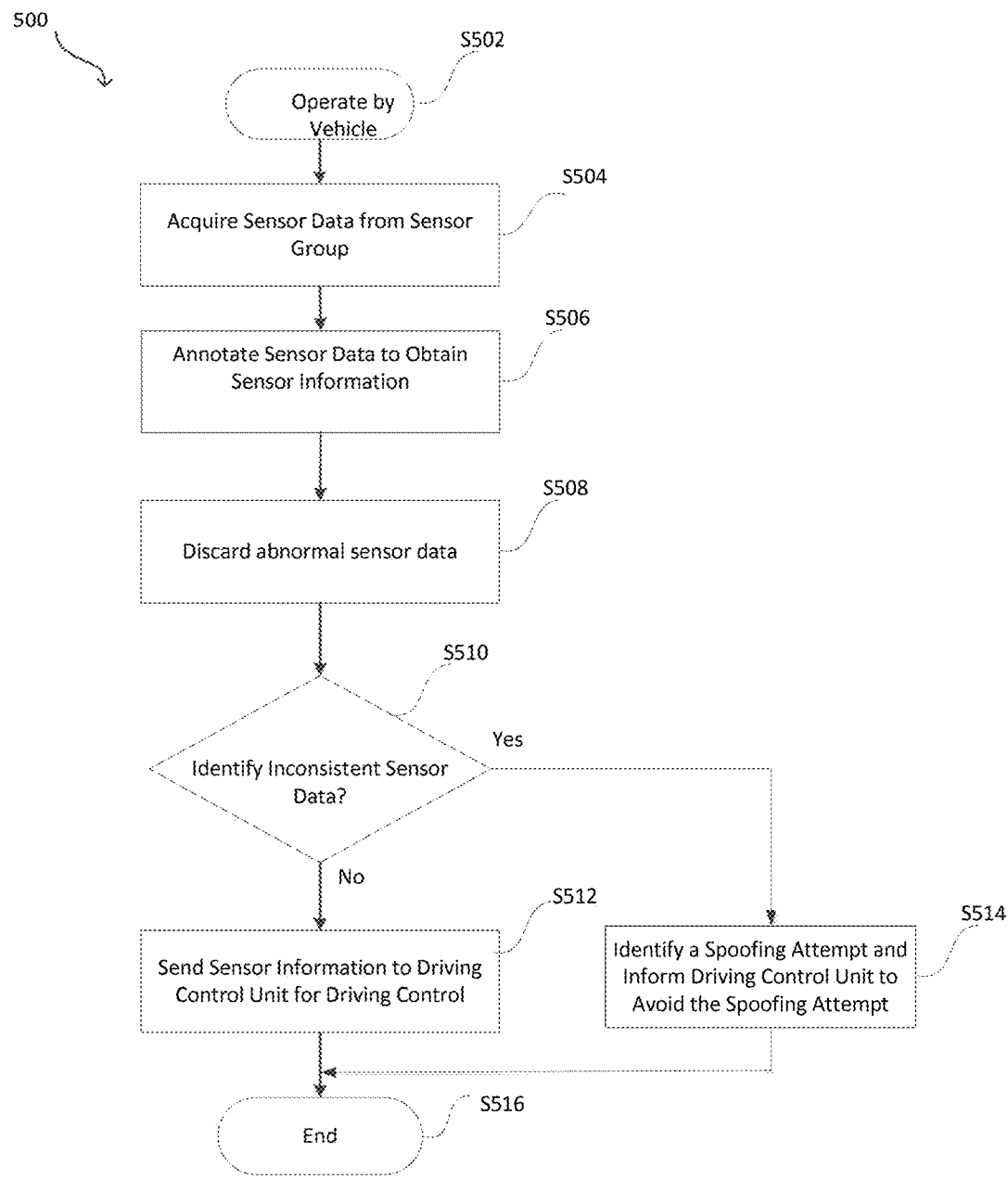
FIG. 3 is a flowchart outlining a first exemplary operation for spoofing prevention, in accordance with some embodiments.

FIG. 3 illustrates a flowchart 500 outlining a first exemplary operation for spoofing prevention, in accordance with embodiments of apparatus 100. The flowchart 500 starts with step 502 where the apparatus 100 for spoofing prevention is operated by an autonomous vehicle, also referred to as a vehicle. As the vehicle drives, the one or more sensors in the sensor group 100A of the apparatus 100 sense the surrounding traffic information and generate one or more sensor data. The one or more sensor data can be stored in the sensor itself or in the memory 110. The one or more sensors can include a camera 102, a radar 104, a LIDAR 106, a sonar 108, or the like.

The flowchart 500 then proceeds to step 504, and the sensor information acquisition means 112 of the apparatus 100 acquires the one or more sensor data continuously, or periodically, or as occasion demands. The sensor information acquisition means 112 can further annotate the one or more sensor data to obtain sensor information to identify traffic information that the one or more sensor data carries. The sensor data annotation can be implemented by a signal processing, an image processing, a video processing, or the like. Upon the completion of the sensor data annotation, the traffic information that the one or more sensor data carries can be identified and extracted. The traffic information can include a position of the vehicle, a movement speed of the vehicle, a movement direction of the vehicle, positions of adjacent objects, movement speeds of adjacent objects, movement directions of adjacent objects, a road condition, a traffic signal, a road obstacle, or the like. The sensor information acquisition means 112 sends the sensor information to the attack detection means 116 of the apparatus 100.

Figure 4:
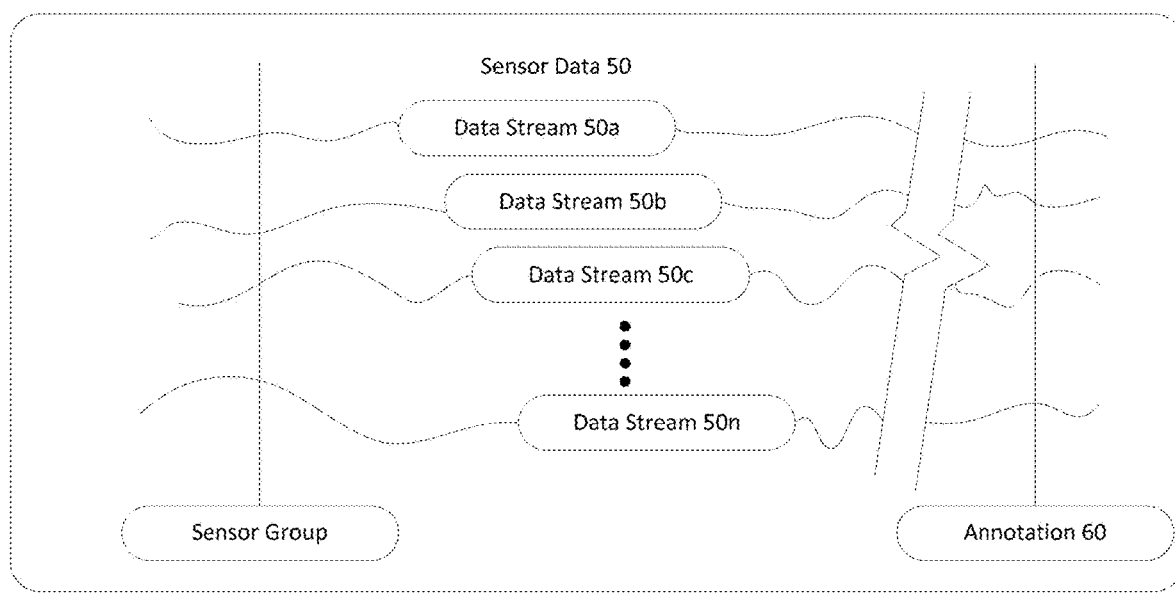
FIG. 4 is an illustration of a schematic diagram for sensor data annotation, in accordance with some embodiments.
Figure 5:
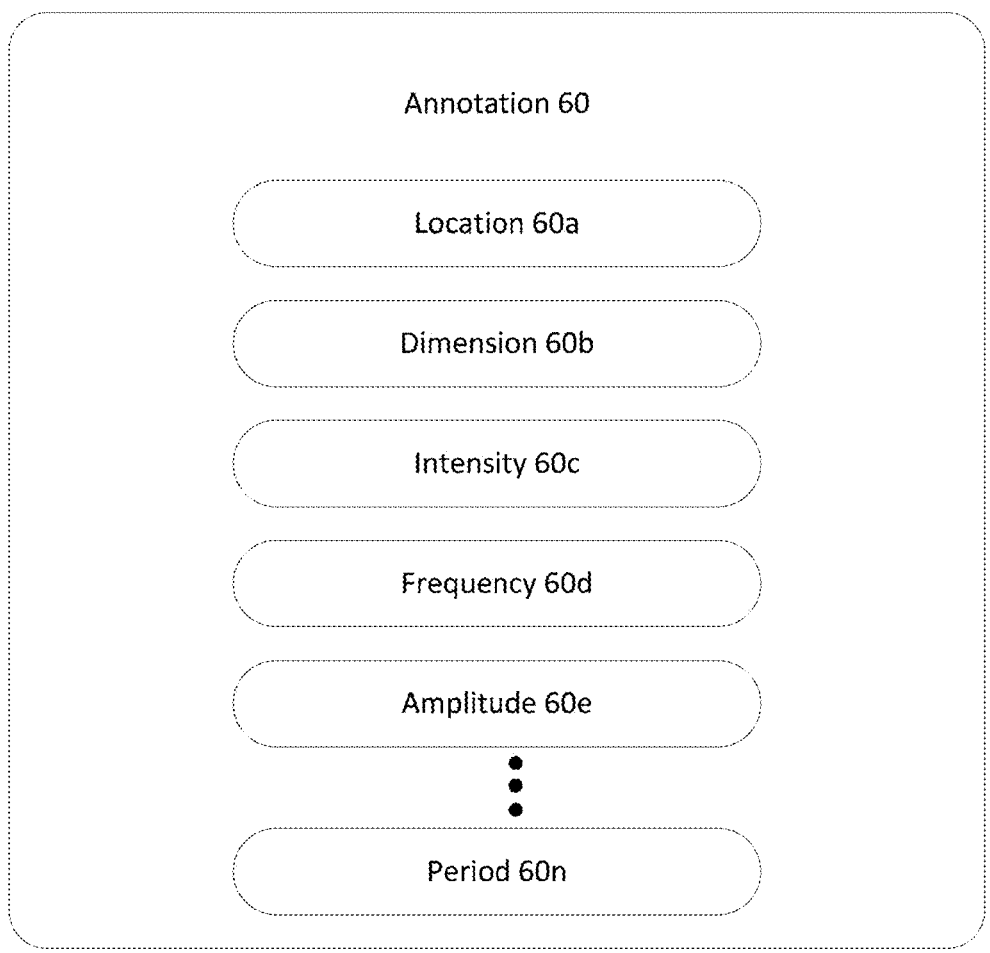
FIG. 5 is a schematic block diagram illustrating an exemplary output of the sensor data annotation, in accordance with some embodiments.

FIG. 4 is an illustration of a schematic diagram for sensor data annotation that is performed by the sensor information acquisition means 112. As shown in FIG. 4, the sensor data 50 can be acquired by the sensor information acquisition means 112 from the sensor group 100A. The sensor data 50 can include one or more sensor data (or output) generated by the one or more sensors in sensor group 100A. In one embodiment, different data streams 50 can represent output of different sensors in the sensor group 100A. For example, a first data stream 50*a* can represent the output of the camera 102, and a second data stream 50*b* can represent the output of the radar 104. Once the sensor data 50 is received, the sensor information acquisition means 112 can further perform annotation 60 to analyze the sensor data 50 to identify the traffic information that the sensor data 50 carries. The exemplary output of the annotation 60 becomes the sensor information and can be illustrated in FIG. 5. In FIG. 5, the sensor information can include location 60*a*, dimension 60*b*, intensity 60*c*, frequency 60*d* and so on to identify the traffic information. In another example, the sensor information can identify an image of a pothole, a walking pedestrian or a falling object (e.g., a barrel) from circumjacent location when the vehicle drives. After annotation, the sensor information can portray the traffic information that the vehicle encounters during driving. The sensor information can be used to quantify an abnormal sensor data in the followed step 508.

In step 508, the attack detection means 116 analyzes the sensor information to identify abnormal sensor data that fails to capture the surrounding traffic information. For example, the camera 102 returns all black pixels (or just noise). The abnormal sensor data can be generated by either a sensor that is malfunctioning or a sensor that is attacked. For example, the camera 102 can be attacked by shining a bright light on the camera. The attack detection means 116 subsequently discard the abnormal sensor data.

The flowchart 500 then proceeds to step 510. In step 510, the attack detection means 116 further verify the sensor information to identify whether one or more inconsistent sensor data is present. The inconsistent sensor data provides different traffic information compared to other sensor data of the one or more sensor data generated by the one or more sensors. For example, a sensor data generated by a primary LIDAR sensor reveals a suddenly present or absent object, and the redundant LIDAR sensor does not reveal such an object. The inconsistency between the sensor data generated by the primary LIDAR sensor and sensor data generated by the redundant LIDAR sensor can be associated with a spoofing attempt. In another example, the camera 102 detects a pothole in front of the vehicle, and other sensors in the sensor group 100A do not capture such a pothole. The inconsistent sensor data generated by the camera 102 may be associated with another spoofing attempt.

Reference is made still to the flowchart of FIG. 3. When it is determined that no inconsistent sensor data is identified by the attack detection means 116 (No in S510), the operation of the flowchart 500 proceeds to step 512. At step 512, the attack detection means 116 sends the determination to the attack response means 118. The attack response means 118 acquires the sensor information that is annotated based on the sensor data generated by the sensors in the sensor group 100A from the attack detection means 116. The attack response means 118 further sends the sensor information to the control driving unit 122. The control driving unit 122 can use the sensor information to control the vehicle accordingly.

When it is determined that at least one sensor data is inconsistent with other sensor data by the attack detection means 116 (Yes in S510), the attack detection means 116 realizes that a spoofing attempt is identified. For example, the sensor data of the LIDAR 106 reveals a pedestrian in front of the vehicle, and other sensor data of the one or more sensor data generated by the one or more sensors does not reveal such a pedestrian. The inconsistent LIDAR sensor data can be associated with a spoofing attempt. In another example, two sensor data generated by two respective sensors in sensor group 100A can be inconsistent with other sensor data generated by the other sensors in the sensor group 100A, which reveals another spoofing attempt associated with the two respective sensors.

In some embodiments, a primary sensor and a redundant sensor can be compared. For example, a primary LIDAR sensor detects an object and a redundant LIDAR sensor (e.g., element 106 in FIG. 2) does not detect such an object. The LIDAR sensors can be spoofed. In another example, the attack detection means 116 can compare values between sensor information annotated based on the sensor data from the primary LIDAR sensor and sensor information annotated based on the sensor data from the redundant LIDAR sensor 106. The compared values include signal intensity, signal frequency, signal period, signal amplitude, signal rising and fall times, signal source location, maximum and minimum values, or the like. The LIDAR sensor data can be labelled to be inconsistent when a difference in signal intensity between the sensor information annotated based on the primary LIDAR sensor data and the sensor information annotated based on the redundant LIDAR sensor data exceeds a threshold. The LIDAR sensor data can also be identified to be inconsistent when signal of the sensor information annotated based on the primary LIDAR sensor data differs in frequency or other signal parameters from the reference signal of the sensor information annotated based on the redundant LIDAR sensor data.

Still referring to the flowchart of FIG. 3, when a spoofing attempt is identified, the operation of the flowchart 500 proceeds to step 514. At step 514, the attack detection means 116 realizes that the inconsistent sensor data identified in step 510 can be a spoofing attempt. The attack detection means 116 sends the determination to the attack response means 118. The attack response means 118 ignores a portion of the sensor information that is associated with the spoofing attempt and acquires another portion of the sensor information that is normal from the attack detection means 116. The attack response means 118 sends the other portion of the sensor information that is normal to the control driving unit 122. The control driving unit 122 can use the received sensor information to control the vehicle accordingly. The control driving unit 122 can ignore the inconsistent sensor data and drive the vehicle unaffectedly. The control driving unit 122 can also take a detour route, stop at a safe place, or change a traffic lane to avoid the potential spoofing attempt. The attack response means 118 can further notify the driver of the potential spoofing attempt via the display 124 or audio device 126. In some embodiments, if there is no driver (e.g., a school bus is driving children to school), via a communication device (not shown), the control driving unit 122 can notify the potential spoofing attempt to a car owner, parents of the children in a school bus, an external service, or police. In some embodiments, the vehicle might not be in autonomous mode, but in "Guardian" mode where the vehicle only takes control to prevent an accident. The attack response means 118 can notify the driver of the potential spoofing attempt via the display 124 or audio device 126, and the driver can make a decision, such as ignoring the spoofing attempt, taking a detour route, stopping at a safe place, or changing a traffic lane to avoid the potential spoofing attempt. In some embodiments, the attack response means 118 can further send the sensor information related to the spoofing attempt to the traffic information means 114 for traffic information update.

The examples mentioned above should not be considered limiting and are merely representative of a variety of approaches for the attack detection means 116 to detect a spoofing attempt. The attack detection means 116 can implement a number of other operations to detect an inconsistent sensor data acquired from the sensor group 100A consistent with the disclosure herein.

Figure 6:
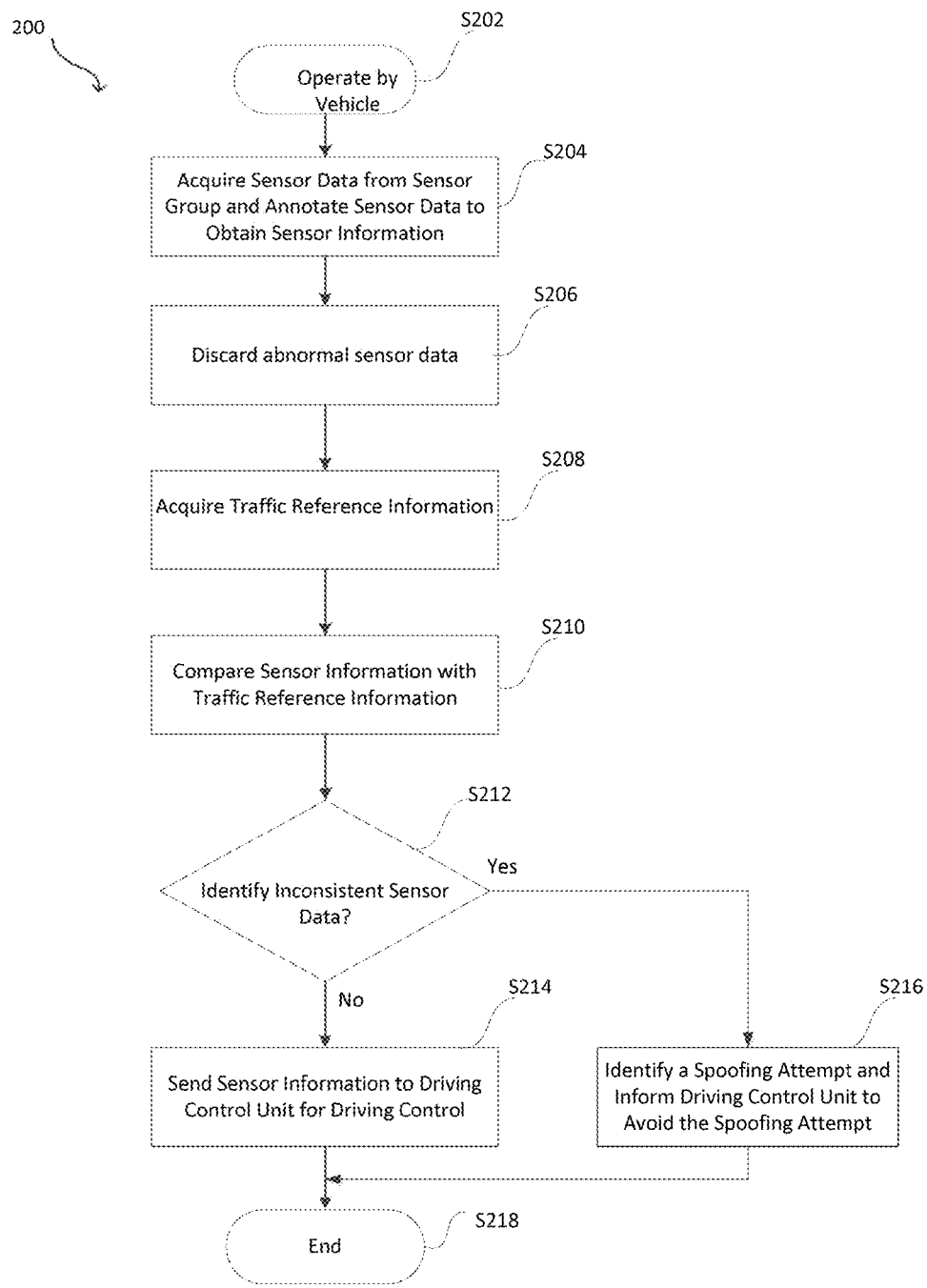
FIG. 6 is a flowchart outlining a second exemplary operation for spoofing prevention, in accordance with some embodiments.

FIG. 6 illustrates a flowchart 200 outlining a second exemplary operation for spoofing prevention, in accordance with embodiments of apparatus 100. The flowchart 200 starts with step 202 where the apparatus 100 for spoofing prevention is operated by an autonomous vehicle, also referred to as a vehicle. As the vehicle drives, the one or more sensors in the sensor group 100A of the apparatus 100 sense the surrounding traffic information and generate one or more sensor data. The one or more sensor data can be stored in the sensor or in the memory 110. The one or more sensors can include a camera 102, a radar 104, a LIDAR 106, a sonar 108, or the like.

The flowchart 200 then proceeds to step 204, and the sensor information acquisition means 112 of the apparatus 100 acquires the one or more sensor data continuously, or periodically, or as occasion demands. The sensor information acquisition means 112 can further annotate the one or more sensor data to obtain sensor information to identify traffic information that the one or more sensor data carries. The sensor data annotation is illustrated in FIGS. 4 and 5. The sensor data annotation can be implemented by a signal processing, an image processing, a video processing, or the like. Upon the completion of the sensor data annotation, the traffic information that the one or more sensor data carries can be identified and extracted. The traffic information can include a position of the vehicle, a movement speed of the vehicle, a movement direction of the vehicle, positions of adjacent objects, movement speeds of adjacent objects, movement directions of adjacent objects, a road condition, a traffic signal, a road obstacle, or the like. The sensor information acquisition means 112 sends the sensor information to the attack detection means 116 of the apparatus 100.

Still referring to FIG. 6, the flowchart 200 proceeds to step 206. At step 206, the attack detection means 116 analyzes the sensor information to identify abnormal sensor data that fails to capture the surrounding traffic information. For example, the camera 102 returns all black pixels (or just noise). The abnormal sensor data can be generated by either a sensor that is malfunctioning or a sensor that is attacked. For example, the camera 102 can be attacked by shining a bright light on the camera. The attack detection means 116 subsequently discard the abnormal sensor data.

The flowchart 200 then proceeds to step 208 where the traffic information means 114 sends the traffic reference information to the attack detection means 116 continuously, or periodically, or as occasion demands. The traffic reference information stored in the traffic information means includes all kinds of sensor data for portraying the traffic information, such as a camera data of a pothole, a LIDAR data of a walking pedestrian or a falling object (e.g., a barrel) from circumjacent location when a vehicle drives. The traffic reference information also include traffic information, such as a position of the vehicle, a movement speed of the vehicle, a movement direction of the vehicle, positions of adjacent objects, movement speeds of adjacent objects, movement directions of adjacent objects, a road condition, a traffic signal, a road obstacle, or the like.

In step 210, the attack detection means 116 compares the sensor information and the traffic reference information. The attack detection means 116 can compare values between the sensor information and the traffic reference information, and the values include signal intensity, signal frequency, signal period, signal amplitude, signal rising and fall times, signal source location, maximum and minimum values, or the like. In an example, a sensor data of a sensor can be identified to be inconsistent with the traffic reference information when signal of sensor information annotated based on the sensor data from the sensor is unexpected detected according to the signal source location. In another example, a sensor data can be labelled to be inconsistent with the traffic reference information when a difference in signal intensity between sensor information annotated based on the sensor data and a reference signal from the traffic reference information exceeds a threshold. In another example, a sensor data can be identified to be inconsistent with the traffic reference information when signal of sensor information annotated based on the sensor data differs in frequency or other signal parameters from the reference signal of the traffic reference information. In yet another example, a sensor data can be labelled to be inconsistent with the traffic reference information when signal of the sensor information annotated based on the sensor data changes drastically in a given amount of time. A signal increases drastically in intensity may indicate an attempt to spoof a sensor, such as shining a laser signal at a LIDAR sensor.

The comparison between the sensor information and the traffic reference information can use image recognition, pattern recognition, feature recognition, and signal recognition. In an example, the attack detection means 116 can use stored algorithm to compare an image captured by the camera 102 about a pothole and an image extracted from the traffic reference information associated with a reference pothole. The attack detection means 116 can identify if the captured image is authentic or includes false information. In another example, the attack detection means 116 can use pattern recognition to detect a spoofing attempt when an object is suddenly present or absent in a scene based on a signal received from a sensor in the sensor group 100A. When the object suddenly present or absent cannot be recognized by the attack detection means 116 through pattern recognition, a spoofing attempt may be detected.

A sensor data of a sensor can be labelled to be inconsistent with the traffic reference information by the attack detection means 116 when no traffic reference information can be retrieved from traffic information means 114.

The examples mentioned above should not be considered limiting and are merely representative of a variety of approaches for the attack detection means 116 to detect a spoofing attempt. The attack detection means 116 can implement a number of other operations to detect an inconsistent sensor data acquired from the sensor group 100A consistent with the disclosure herein.

Reference is made still to the flowchart of FIG. 6. When it is determined that no sensor data is identified to be inconsistent with the traffic reference information by the attack detection means 116 (No in S212), the operation of the flowchart 200 proceeds to step 214. At step 214, the attack detection means 116 sends the determination to the attack response means 118. The attack response means 118 acquires the sensor information that is annotated based on the sensor data generated by the sensors in the sensor group 100A from the attack detection means 116. The attack response means 118 further sends the sensor information to the control driving unit 122. The control driving unit 122 can use the sensor information to control the vehicle accordingly.

When it is determined that at least one sensor data generated by at least one sensor in the sensor group 100A is inconsistent with the traffic reference information by the attack detection means 116 (Yes in S212), the attack detection means 116 realizes that the inconsistent sensor data identified in step 210 can be a spoofing attempt. The flowchart 200 correspondingly proceeds to step 216. In step 216, the attack detection means 116 sends the determination to the attack response means 118. The attack response means 118 ignores a portion of the sensor information that is associated with the spoofing attempt and acquires another portion of the sensor information that is normal from the attack detection means 116. The attack response means 118 further sends the other portion of the sensor information that is normal to the control driving unit 122. The control driving unit 122 can use the received sensor information to control the vehicle accordingly. The control driving unit 122 can ignore the abnormal sensor data and drive the vehicle unaffectedly. The control driving unit 122 can also take a detour route, stop at a safe place, or change a traffic lane to avoid the potential spoofing attempt. The attack response means 118 can further notify the driver of the potential spoofing attempt via the display 124 or audio device 126. In some embodiments, if there is no driver (e.g., a school bus is driving children to school), via a communication device (not shown), the control driving unit 122 can notify the potential spoofing attempt to a car owner, parents of the children in a school bus, an external service, or police. In some embodiments, the vehicle might not be in autonomous mode, but in "Guardian" mode where the vehicle only takes control to prevent an accident. The attack response means 118 can notify the driver of the potential spoofing attempt via the display 124 or audio device 126, and the driver can make a decision, such as ignoring the spoofing attempt, taking a detour route, stopping at a safe place, or changing a traffic lane to avoid the potential spoofing attempt. In some embodiments, the attack response means 118 can further send the sensor information related to the spoofing attempt to the traffic information means 114 for traffic information update.

Figure 7:
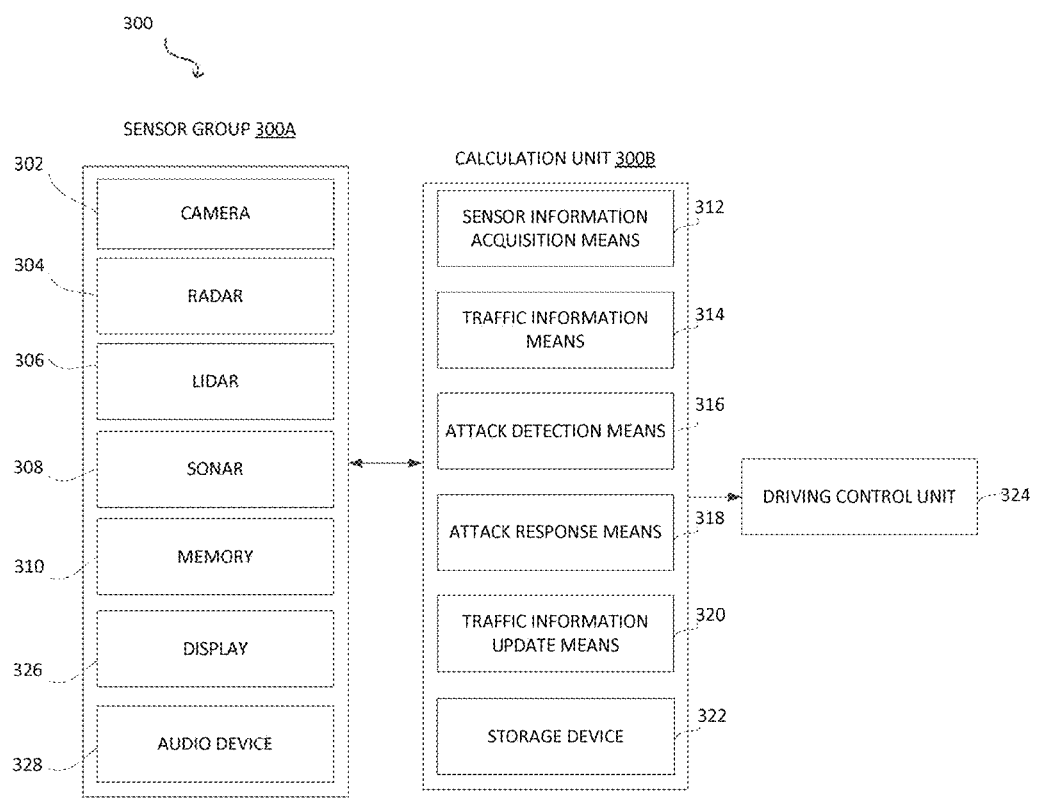
FIG. 7 is an illustration of another exemplary apparatus for spoofing prevention, in accordance with some embodiments.

FIG. 7 illustrates another exemplary apparatus for spoofing prevention 300. Comparing to the apparatus 100, traffic information update means 320 is included in the calculation unit. As shown in FIG. 8, a machine learning algorithm is stored in the traffic information update means 320. The traffic information update means 320 is configured to perform feature learning/target classification through the experienced spoofing attempt (e.g., Yes in S212) mentioned above, and updates the lesson/learning into traffic information means to catch similar spoofing attempt or potential hazard more promptly and accurately in the future.

An exemplary machine learning process performed by the traffic information update means 320 is shown in FIG. 8. Portraying the spoofing attempt (Yes in S212) is accomplished via object recognition and machine learning. In an exemplary embodiment, a standard convolutional neural network (CNN) approach is used. While a CNN is described herein, it should not be considered limiting and is merely representative of a variety of approaches to object recognition. In the context of the present disclosure, a CNN is trained 700 on a curated database 702 of hypothetical spoofing attempts or potential hazards. The curated database 702 can be part of the traffic information update means. The curated database 702 can also be stored in the storage device 322. The database 702 contains the sensor information associated with the experienced spoofing attempt or potential hazard mentioned above. The curated database 702 is actively maintained and updated via system software or via cloud-based system software updates. Feature learning 704 and target classification 706 are performed on the database 702 to portray the spoofing attempt of the potential hazard. Generally, feature learning 704 includes iterative convolution, activation via rectified linear units, and pooling, while classification 706 includes associating learned features with known labels. Learned features (e.g. edges, corners, signal parameters) may be manually selected or determined by the CNN via deep learning or similar approach. Following training 700 of the CNN, testing of the CNN is performed to ensure accuracy. Features are extracted from a test image and classified according to the training classifier 700. Following confirmation of the efficacy of the trained classifier, the traffic information update means 320 can send the feature learning 704 and target classification 706 about the spoofing attempt or potential hazard to the traffic information means 314 for the update. In addition, the CNN can be implemented in the attack detection means 316 for detecting future spoofing attempt or potential hazard.

Still referring to FIG. 8, an operation 710 can be demonstrated based on machine learning results to catch a similar spoofing attempt or potential hazard promptly in the future. A similar spoofing attempt or potential hazard 712 can be experienced by the vehicle during driving. The sensor information acquisition means 312 sends the sensor information to the attack detection means 316. The attack detection means 316 can use the trained CNN mentioned above to operate feature extraction 714 and target classification 716 based on the acquired sensor information that is associated with the spoofing attempt or potential hazard 712. The attack detection means 316 can identify the spoofing attempt or potential hazard 712 promptly and effectively through the target classification 716.

Figure 9:
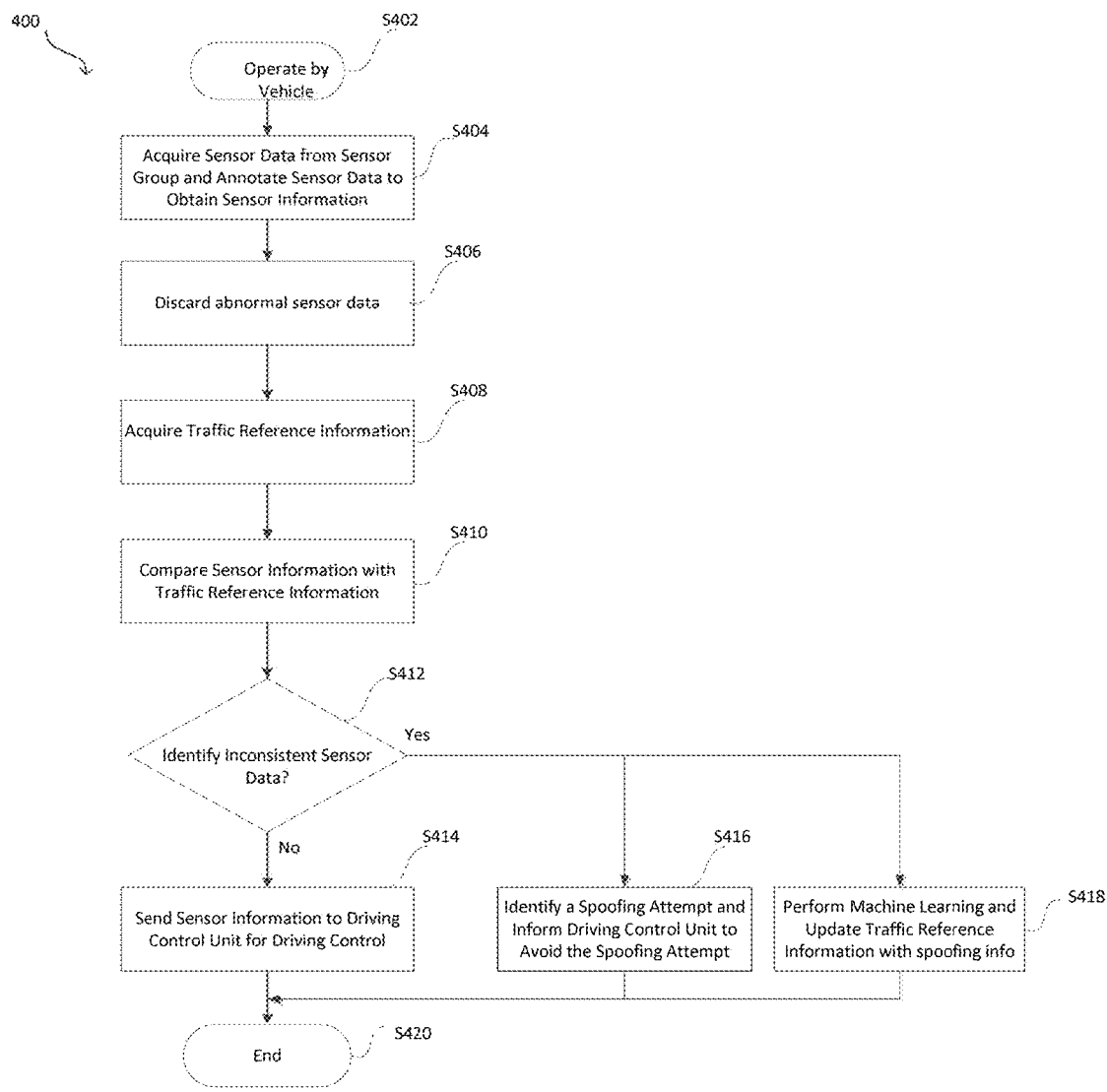
FIG. 9 is a flowchart illustrating a third exemplary operation for spoofing prevention, in accordance with some embodiments.

FIG. 9 is a flowchart 400 illustrating a third exemplary operation for spoofing prevention, in accordance with the apparatus 300 as shown in FIG. 7. The flowchart 400 starts with step 402 where an autonomous vehicle drives and the sensor group 300A senses surrounding traffic information and generates one or more sensor data.

In step 404, the sensor information acquisition means 312 acquires the one or more sensor data continuously, or periodically, or as occasion demands from the sensor group. The sensor information acquisition means 312 can also annotate the one or more sensor data to obtain sensor information. The sensor information can extract traffic information that the one or more sensor data carries. Further, the sensor information acquisition means 312 sends the sensor information to the attack detection means 316.

The flowchart 400 proceeds to step 406 where the attack detection means 316 analyzes the sensor information to identify abnormal sensor data that fails to capture the surrounding traffic information. For example, the camera 302 returns all black pixels (or just noise). The abnormal sensor data can be generated by either a sensor that is malfunctioning or a sensor that is attacked. For example, the camera 302 can be attacked by shining a bright light on the camera. The attack detection means 316 subsequently discard the abnormal sensor data.

The flowchart 400 then proceeds to step 408 where the traffic information means 314 sends the traffic reference information to the attack detection means 316 continuously, or periodically, or as occasion demands. The traffic reference information stored in the traffic information means includes all kinds of sensor data for portraying the traffic condition.

In step 410 of the flow chart 400 as shown in FIG. 9, the attack detection mean 316 compares the sensor information and the traffic reference information to catch inconsistent sensor data with the traffic reference information. As same as the step of 208, the attack detection mean 316 can compare signal parameters between the sensor information and the traffic reference information. The signal parameters include signal intensity, signal frequency, signal period, signal amplitude, signal rising and fall times, source location, maximum and minimum values, or the like. The attack detection mean 316 can also conduct comparison through technique of image recognition, pattern recognition, feature recognition, and signal recognition.

When it is determined that no sensor data is identified to be inconsistent with the traffic reference information by the attack detection means 316 (No in S412), the flowchart 400 proceeds to step 414 where the attack detection means 316 sends the determination to the attack response means 318. The attack response means 318 acquires the sensor information annotated based on the sensor data from the attack detection means 316. The attack response means 318 further sends the sensor information to the control driving unit 324. The control driving unit 324 can use the sensor information to control the vehicle accordingly.

When it is determined that at least one sensor data of the one or more sensors in sensor group 300A is inconsistent with the traffic reference information by the attack detection means 316 (Yes in S412), the attack detection means 316 realizes that the inconsistent sensor data identified in step 410 can be associated with a spoofing attempt. The flowchart 400 then proceeds to step 416 where the attack detection means 316 sends the determination to the attack response means 318. The attack response means 318 ignores a portion of the sensor information that is annotated based on the inconsistent sensor data and acquires another portion of the sensor information that is annotated based on other sensor data that is normal from the attack detection means 316. The attack response means 318 further sends the other portion of the sensor information annotated based on the other sensor data that is normal to the control driving unit 324. The control driving unit 324 can use the received sensor information to control the vehicle accordingly. In addition, the flowchart 400 can proceeds to step 418 where the traffic information update means 320 can perform feature learning/target classification through a machine learning algorithm (as shown in FIG. 8) based on the sensor information associated with the spoofing attempt (Yes in S412) separately, and update the lesson/Learning into traffic information means 314 to catch similar spoofing attempt more promptly and accurately in the future. It should be noted that the machine learning process is operated separately and the driving control unit 324 is not impacted.

Still referring to FIG. 9, flowchart 400, the machine learning process illustrated in FIG. 8 can be used to update the traffic reference information in the traffic information means (314 in FIG. 7 or 114 in FIG. 2) when no traffic reference information can be retrieved from the traffic information means to compare a sensor data generated by a sensor in the sensor group. When no traffic reference information can be extracted from the traffic information means to compare the sensor data, the sensor data is labelled to be inconsistent with the traffic reference information by the attacking detection means 316 in step S410 and the operation proceeds to step 418 accordingly. After the machine learning process in step 418, the all sensor data can be classified to be associated with the spoofing attempt. The all sensor data can be labelled and updated to the traffic reference information stored in the traffic information means to portray the potential spoofing attempt in the future. Accordingly, the traffic information means can provide traffic reference information to all the sensors in the sensor group 300A when the similar spoofing attempt is experienced again in the future.

In the present disclosure, a novel method and an apparatus for detecting a spoofing attempt associated with an autonomous vehicle is provided. The apparatus has a sensor group, a calculation unit and a driving control unit. The sensor group can include one or more sensors and the one or more sensors can generate one or more sensor data. The one or more sensor data can be acquired by the calculation unit and annotated to obtain sensor information to identify the traffic information that the one or more sensor data carries. The traffic reference information is stored in the calculation unit with periodical updates. The processing circuitry of the calculation unit can identify a spoofing attempt through verifying the consistency of the sensor data generated by the sensors or based on comparison between the sensor information and the traffic reference information. When the spoofing attempt is identified, a portion of the sensor information that is associated with the spoofing attempt is ignored and another portion of the sensor information that is normal is sent to the driving control unit for driving control. In addition, a machine learning algorithm stored in the calculation unit performs feature learning and target classification on the sensor information associated with the spoofing attempt, and the learning/lesson can be sent to the traffic reference information for traffic information update so as to catch similar spoofing attempt more promptly and effectively.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:
1. A method for spoofing prevention, comprising:
acquiring, via interface circuitry installed in a vehicle, one or more sensor data generated by one or more sensors including information to identify traffic information;
annotating, via processing circuitry, the one or more sensor data to obtain sensor information, the sensor information extracting traffic information that the one or more sensor data carries, the one or more sensor data annotation being implemented by at least one of a signal processing, an image processing, and a video processing;
determining sensor data to be abnormal sensor data when the sensor data fails to capture surrounding traffic information, the sensor data having all black pixels when abnormal;
discarding the abnormal sensor data that fails to capture the surrounding traffic information;
after discarding the abnormal sensor data, determining whether the sensor data, other than the discarded abnormal sensor data, is part of a spoofing attempt by comparing the sensor data to sensor data from multiple sensors to determine whether the sensor data is inconsistent with the sensor data from the multiple sensors, the sensor data being determined to be inconsistent with the sensor data from the multiple sensors when traffic information therein differs from traffic information in the sensor data from the multiple sensors, the sensor data and the sensor data from the multiple sensors being contemporaneously generated;
informing, via the interface circuitry, the vehicle to ignore a portion of the sensor information that is associated with the spoofing attempt when the spoofing attempt is identified,
wherein the comparing the sensor information and the traffic reference information includes comparing signal intensity, signal frequency, signal period, signal amplitude, signal rise and fall times, source location, and minimum and maximum values between the sensor data and the traffic reference information, and the abnormal sensor data is generated by either a sensor that is malfunctioning or a sensor that is attacked.

2. The method of claim 1, further comprising:
notifying the spoofing attempt to a driver of the vehicle, a vehicle owner, an external service, police, or parents of children in the vehicle via a display, a speaker, or a communication device.

3. The method of claim 1, wherein acquiring the one or more sensor data from the one or more sensors includes acquiring the sensor data from at least one of a camera, a sonar sensor, a radar sensor, and a LIDAR (Light Detecting and Ranging) sensor.

4. The method of claim 1, wherein the one or more sensors are either primary sensors installed originally for autonomous driving or redundant sensors spaced a distance apart from the primary sensors.

5. The method of claim 3, further comprising:
acquiring a first sensor data from a primary sensor;
acquiring a second sensor data from a redundant sensor; and
determining a spoofing attempt based on a determination that the first sensor data from the primary sensor is inconsistent with the second sensor data from the redundant sensor.

6. The method of claim 1, wherein the traffic information that the one or more sensor data carries includes at least one of a position of the vehicle, a movement speed of the vehicle, a movement direction of the vehicle, positions of adjacent objects, movement speeds of adjacent objects, movement directions of adjacent objects, a road condition, a traffic signal, and a road obstacle.

7. The method of claim 1, wherein the abnormal sensor data is generated by either a sensor that is malfunctioning or a sensor that is attacked.

8. The method of claim 1, further comprising updating the traffic reference information with the portion of the sensor information associated with the potential hazard.

9. A method for spoofing prevention, comprising:
acquiring, via interface circuitry installed in a vehicle, one or more sensor data generated by one or more sensors including information to identify traffic information;
annotating, via processing circuitry, the one or more sensor data to obtain sensor information, the sensor information extracting traffic information that the one or more sensor data carries, the one or more sensor data annotation being implemented by at least one of a signal processing, an image processing, and a video processing;
determining whether sensor data is abnormal sensor data that fails to capture surrounding traffic information, the sensor data having all black pixels when abnormal;
discarding the abnormal sensor data that fails to capture surrounding traffic information;
acquiring, via the interface circuitry, traffic reference information from a database;
after discarding the abnormal sensor data, comparing, using the processing circuitry, the sensor data, other than the discarded abnormal sensor data, with the traffic reference information;
after discarding the abnormal sensor data, identifying, using the processing circuitry, whether the sensor data, other than the discarded abnormal sensor data, is part of a spoofing attempt based on the comparison between the sensor data and the traffic reference information, the spoofing attempt being identified when a portion of the sensor data differs from the traffic reference information that is contemporarily generated with acquisition of the sensor data; and informing, via the interface circuitry, the vehicle to ignore the portion of the sensor information that is associated with the spoofing attempt when the spoofing attempt is identified, wherein the comparing the sensor information and the traffic reference information includes comparing signal intensity, signal frequency, signal period, signal amplitude, signal rise and fall times, source location, and minimum and maximum values between the sensor data and the traffic reference information, and the abnormal sensor data is generated by either a sensor that is malfunctioning or a sensor that is attacked.

10. The method of claim 9, further comprising:
performing machine learning on the sensor data and updating the traffic reference information with the portion of the sensor data that is associated with the spoofing attempt.

11. The method of claim 9, wherein identifying the spoofing attempt further comprises:
comparing the sensor and the traffic reference information;
identifying at least one inconsistent sensor data based on the comparison between the sensor data and the traffic reference information, the at least one inconsistent sensor data providing different traffic information compared to the traffic reference information; and
determining the spoofing attempt based on a determination that the at least one inconsistent sensor data is identified.

12. An apparatus for spoofing prevention, comprising:
one or more sensors, the one or more sensor installed in a vehicle and configured to generate one or more sensor data, the one or more sensor data carrying traffic information that the vehicle encounters during driving; and processing circuitry configured to:
acquire, via interface circuitry, the one or more sensor data from the one or more sensors;
annotate the one or more sensor data to obtain sensor information, the sensor information extracting the traffic information that the one or more sensor data carries, the one or more sensor data annotation being implemented by at least one of a signal processing, an image processing, and a video processing;
determine whether sensor data is abnormal sensor data that fails to capture surrounding traffic information, the sensor data having all black pixels when abnormal;
discard the abnormal sensor data that fails to capture the surrounding traffic information;
after discarding the abnormal sensor data, determine whether the sensor data is part of a spoofing attempt by comparing the sensor data, other than the discarded abnormal sensor data, to sensor data from multiple sensors to determine whether the sensor data is inconsistent with the sensor data from the multiple sensors, the sensor data being determined to be inconsistent with the sensor data from the multiple sensors when traffic information therein differs from traffic information in the sensor data from the multiple sensors, the sensor data and the sensor data from the multiple sensors being contemporaneously generated;

inform, via the interface circuitry, the vehicle to ignore a portion of the sensor information that is associated with the spoofing attempt when the spoofing attempt is identified, wherein the comparing the sensor information and the traffic reference information includes comparing signal intensity, signal frequency, signal period, signal amplitude, signal rise and fall times, source location, and minimum and maximum values between the sensor data and the traffic reference information, and the abnormal sensor data is generated by either a sensor that is malfunctioning or a sensor that is attacked.

13. The apparatus of claim 12, wherein the one or more sensors include at least one of a camera, a sonar sensor, a radar sensor, and a LIDAR (Light Detecting and Ranging) sensor.

14. The apparatus of claim 12, wherein the one or more sensors are either primary sensors installed originally for autonomous driving or redundant sensors spaced a distance apart from the primary sensors.

15. The apparatus of claim 12, wherein the processing circuitry is further configured to:
   acquire, via the interface circuitry, traffic reference information from a database;
   compare the sensor information and the traffic reference information;
   identify a spoofing attempt based on the comparison between the sensor information and the traffic reference information; and
   inform, via the interface circuitry, the vehicle to ignore a portion of the sensor information that is associated with the spoofing attempt when the spoofing attempt is identified.

16. The apparatus of claim 15, wherein the processing circuitry is further configured to:
   compare the sensor information and the traffic reference information;
   identify at least one inconsistent sensor data based on the comparison between the sensor information and the traffic reference information, the at least one inconsistent sensor data providing different traffic information compared to the traffic reference information; and
   determine the spoofing attempt based on a determination that the at least one inconsistent sensor data is identified.

17. The apparatus of claim 15, wherein the processing circuitry is further configured to:
   perform machine learning on the sensor information and update the traffic
   reference information with the portion of the sensor information that is associated with the spoofing attempt.

18. The apparatus of claim 16, wherein the processing circuitry is further configured to:
   notifying the spoofing attempt to a driver of the vehicle, a vehicle owner, an external
   service, police, or parents of children in the vehicle via a display, a speaker, or a communication device.

* * * * *